United States Patent [19]

Nichols, Sr. et al.

[11] Patent Number: 4,779,298
[45] Date of Patent: Oct. 25, 1988

[54] FOLDABLE CABLE-SUPPORTED RAMP

[76] Inventors: Delmar G. Nichols, Sr.; Delmar G. Nichols, Jr., both of 3700 French Rd., Caro, Mich. 48723

[21] Appl. No.: 80,665

[22] Filed: Aug. 3, 1987

[51] Int. Cl.4 .......................... E01D 1/00; E01D 15/00
[52] U.S. Cl. ..................................... 14/69.5; 182/218; 182/223; 193/41
[58] Field of Search ................ 14/69.5, 71.1; 182/218, 182/223; 193/38, 41; 280/32; 414/537

[56] References Cited

U.S. PATENT DOCUMENTS

| | | | |
|---|---|---|---|
| 484,086 | 10/1892 | Cassidy | 14/71.1 |
| 653,942 | 7/1900 | Willis et al. | 193/41 X |
| 802,741 | 10/1905 | Dennis | 182/218 X |
| 976,074 | 11/1910 | Hartman | 182/218 X |
| 1,115,775 | 11/1914 | Bisbach | 14/69.5 X |
| 1,232,437 | 7/1917 | Simpson | 14/69.5 |
| 1,776,565 | 9/1930 | Morton | 182/218 X |
| 3,009,183 | 11/1961 | Lay | 14/69.5 |
| 3,517,791 | 6/1970 | Miles | 14/69.5 X |
| 3,943,589 | 3/1976 | Pedersen | 14/69.5 |
| 4,084,713 | 4/1978 | Rohrs et al. | 14/69.5 X |

Primary Examiner—Jerome W. Massie
Assistant Examiner—John F. Letchford
Attorney, Agent, or Firm—Learman & McCulloch

[57] ABSTRACT

A portable foldable ramp for bridging the space between ground level and a raised level such as the bed of a pickup truck, to permit the passage of the wheels of all-terrain vehicles and like products. The ramp has a pair of generally U-shaped ramp sections hingedly connected in end-to-end alignment so as to be foldable to coextensive bottom-to-bottom abutment for ease of transport. A somewhat stiff, flexible cable has its ends connected to the remote ends of the bottoms of the ramp sections to support the load. The cable is guided when the ramp sections are folded to dispose it in looped configuration within the confines of the coextensive ramp sections which intermesh when the ramp sections are folded.

15 Claims, 2 Drawing Sheets

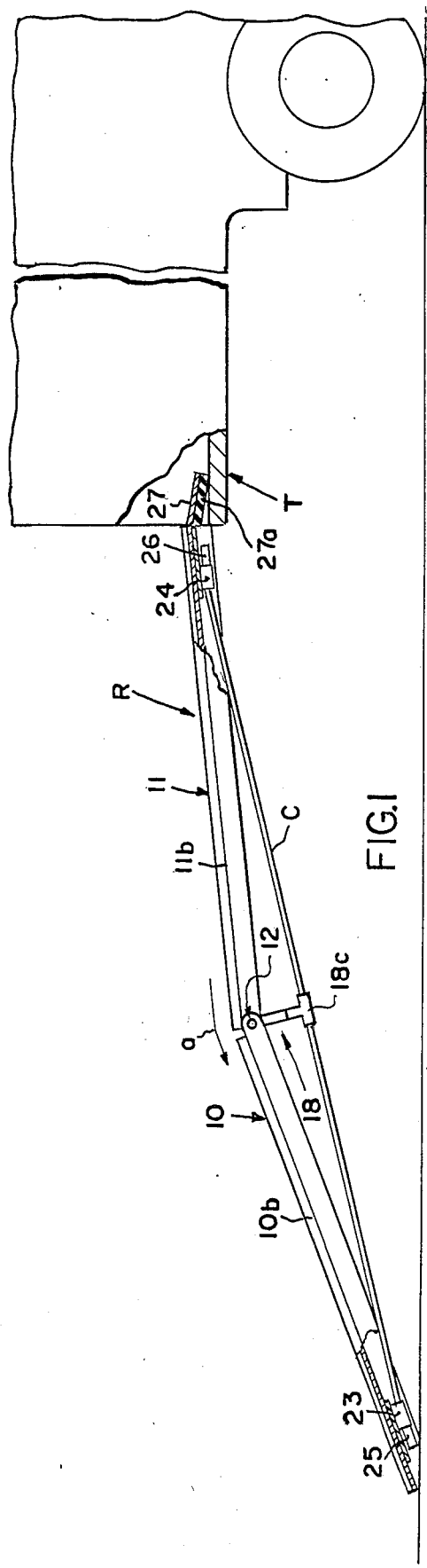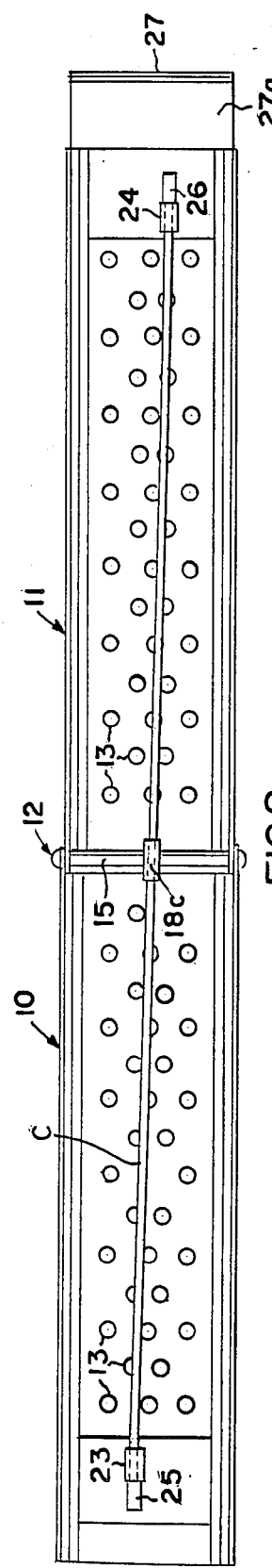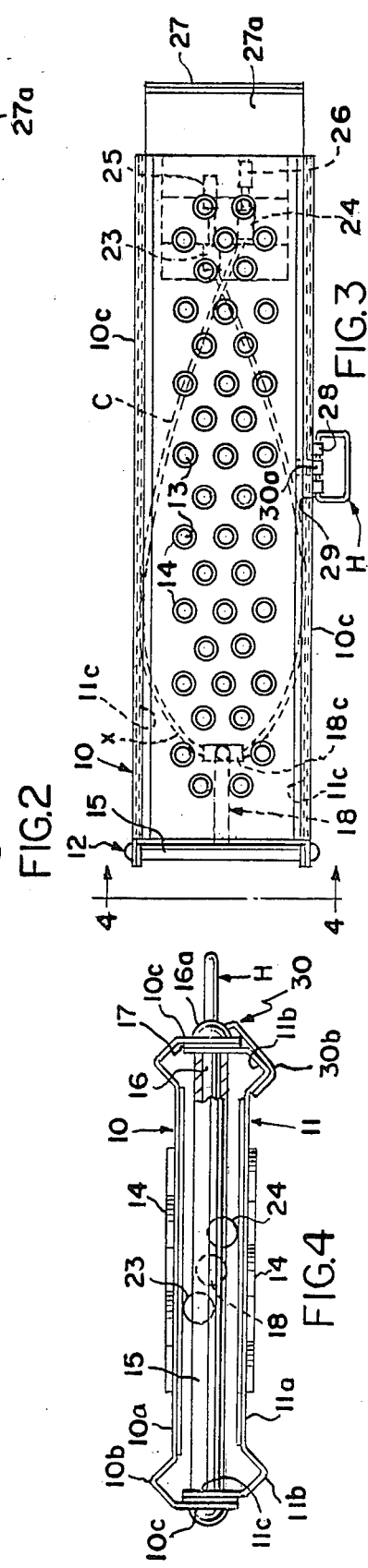

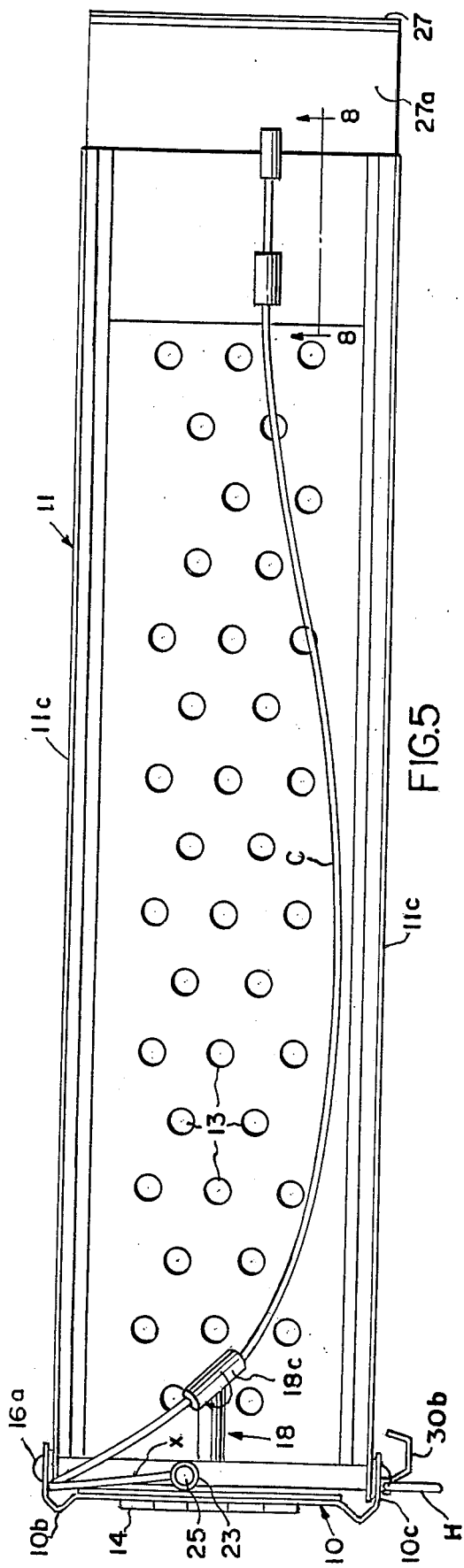
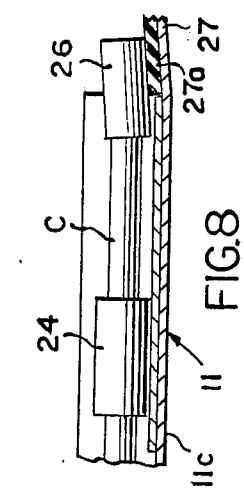
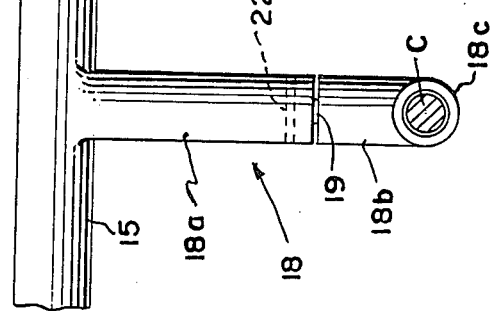
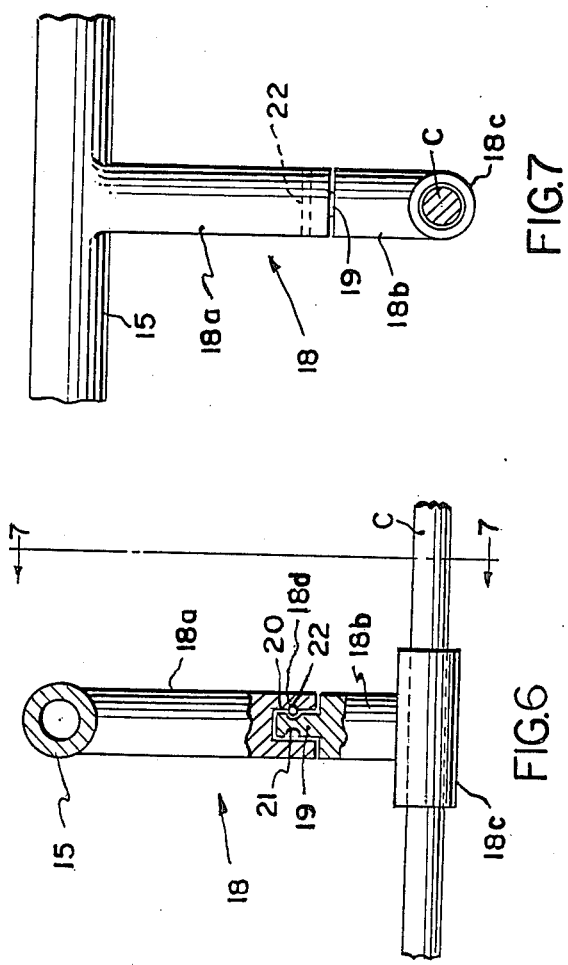

4,779,298

FOLDABLE CABLE-SUPPORTED RAMP

BACKGROUND OF THE INVENTION

This invention relates to readily portable ramp structures for bridging the space between ground level and a raised level such as the bed of a pick-up truck to permit products, such as all-terrain vehicles to be loaded and unloaded to and from the truck. Such ramp structures are used in pairs to support the four wheels of a vehicle in transit.

Various scaffolds and ramps have been proposed as gang-ways or ramps, as exemplified in the following patents:

| 653,942 | Willis et al | 1,776,565 | Morton |
|---|---|---|---|
| 976,074 | Hartman | 3,009,183 | Lay |
| 1,115,775 | Bisbach | 3,943,589 | Pedersen |
| 1,232,437 | Simpson | 4,084,713 | Rohrs et al |

These prior structures, while employing non-skid surfaces, and in some instances cable-type trusses, have not provided a structure which achieves the objects of the present invention.

SUMMARY OF THE INVENTION

The present invention is concerned with a foldable ramp wherein the somewhat stiff, rugged, steel cable assumes a loop configuration within intermeshed ramp sections which form a casing for carrying the looped cable when the ramp is to be transported from one location to another.

It is a prime object of the invention to provide hingedly connected, end-to-end disposed, top curbed ramp sections which fold to intermeshed, co-extensive, bottomto-bottom abutment for ease of transport.

It is another object of the invention to provide mechanism for guiding and restraining the cable such that when the ramp sections are folded to intermeshed position, the cable assumes a loop form within the confines of the folded and intermeshed ramp sections, and does not interfere with the folding of the ramp sections to intermeshed position.

Still another object of the invention is to provide a ramp structure having a support cable which, when stretched taut by the weight of the ramp sections and any weight applied thereto, positively holds the ramp sections in the desired relative position of slight incline, one to the other.

Another object of the invention is to provide a foldable ramp structure wherein the cable is centrally supported by a protruding strut sleeve which is pivotal from a position of lengthwise alignment with the ramp sections to a broadside position in which it also does not interfere with the folding of the ramp sections.

Still another object of the invention is to provide a ramp structure of the character described wherein the mere opening of the ramp sections from folded to end-to-end disposed operative position automatically swivels the strut guide to operative position to permit the cable to reach the taut condition of support.

Still another object of the invention is to provide a ramp structure of the character described having a cable which extends freely through the central strut sleeve guide so that the sleeve guide can rotate when the ramp sections are folded, and the ends of the cable can extent to permit the cable to lie flush against the bottoms of the ramp sections.

Still another object of the invention is to provide foldable ramp sections of the type described which need employ only a single cable as a support member.

The ramp structure makes the use of end-to-end disposed, side-curbed ramp sections which can be relatively narrow in width and light in weight. A cable which connects to the remote ends of the ramp sections is connected in a manner as such that the cable ends can slide with respect to the ramp sections in one direction, but are brought into a position of abutment with cable guides affixed on the bottoms of the ramp section when returned so that a central strut can operate to hold the cable in a taut position in which it supports the weight applied to the ramp sections.

Other objects and advantages of the invention will be pointed out specifically or will become apparent from the following description when it is considered in conjunction with the appended claims and the accompanying drawings, wherein:

IN THE DRAWINGS

FIG. 1 is a side elevational view showing the ramp in an unfolded operative position;

FIG. 2 is an under plan view thereof;

FIG. 3 is a top plan view showing the ramp sections in folded position, the broken lines indicating the position of the cable when the ramp sections are in coextensive folded position;

FIG. 4 is an enlarged end view taken on the line 4—4, with a section broken away to illlustrate the construction of the hinge;

FIG. 5 is an enlarged, under plan view illustrating the position of the cable guide parts during the folding operation, the ramp sections in this view being disposed at right angles one to another;

FIG. 6 is an enlarged, partly sectional view illustrating the construction of the central cable guide strut;

FIG. 7 is an elevational view taken on the line 7—7 of FIG. 6; and

FIG. 8 is a fragmentary side elevational view illustrating the manner in which the cable ends connect.

Referring now more particularly to the accompanying drawings, the ramp structure R includes a pair of ramp sections generally designated 10 and 11 which are hingedly connected together by a hinged connection generally designated 12. As FIG. 4 particularly illustrates, ramp section 10 is formed from a single sheet of metal, or like rigid material, and comprises a central gangway section 10a bounded at its sides by upwardly projecting V-shaped curbs 10b. Finally, the side edges of the sheet are bent to reversely provide side walls or rails 10c. Thus, in end view, the ramp sections 10 have a generally U-shaped configuration. The openings 13 punched in the gangway portion 10a of the ramp section 10 are formed in a manner to provide upwardly protruding annular edges or projections. Collectively, the edges 14 provide a vehicle tire tread-engaging, non-skid surface over the length of the top of ramp section 10. Ramp section 11 is formed in a similar manner with a central gangway portion 11a, bounded by generally v-shaped curb sections 11b. The width of the ramp section 11 produced is slightly decreased relative to he width of ramp section 10 so that the walls 11c at the edges of the curbs 11b can interfit within the wall sections 10c of ramp section 10. In cross-section, or from the end, the ramp section 11 also is generally U-shaped and provided with similar protruding edges 14 on the edges of the openings 13 punched in the bottom of the ramp section 11.

The hinged connection 12 is formed by a sleeve 15 affixed to the ramp section 11 between the walls 11c. Pins 16, extend through openings provided in the wall section 10c and 11c, and through washers 17 interposed between the wall sections 10c and 11c. The enlarged heads 16a of the pins 16 are affixed to the ramp section 10 walls 10c.

Mounted centrally to project from the sleeve 15 at right angles thereto is a post or strut, generally designated 18, which includes a portion 18a affixed to the sleeve 15 and a portion 18b having an elongated guide sleeve 18c affixed thereto. The portion 18b has a protruding annular plug 19 received within a bore 20 provided in the part 18a, and shaft 19 is annularly grooves as at 21 to receive a pin 22 which is seated in an opening 18d provided in the part 18a. The structure described permits the part 18b to swivel 90° in either direction, with respect to the part 18a, with pin 22 preventing axial separation of the parts. It is necessary that the part 18b be swiveled to permit the ramp sections to be folded in the desired manner in back-to-back coextension.

The ramp is operated in the position indicated in FIG. 1 in which there is a slight angularity between the upper surfaces of ramp sections 10 and 11 and is supported in this position by a cable made up of a twisted steel strands C which passes freely through the strut sleeve 18c. The structurally rugged cable is of a diameter such as to be somewhat inflexible in the sense it cannot be bent or folded back upon itself as though it were rope. It is sufficiently flexible to form the loop shown in FIG. 3. At each end, the cable C passes freely through a sleeve guide 23 affixed to the underside of ramp section 10, and a sleeve guide 24 affixed to the under side of ramp section 11. Mounted on the ends of the cable C are abutments 25 and 26 which move into end abutting engagement with the sleeves 23 and 24, respectively, when the ramp is unfolded to assume the position in which it is shown in FIG. 1 and the cable C is tautly stretched. Cable C, which takes the load, is amply strong to support the weight of the ramp sections 10 and 11, an all-terrain vehicle which is traveling thereover, and the occupant of the all terrain vehicle. An angularly disposed bridge plate 27 affixes to the end of the ramp section 11 and is provided with a rubber or similar protective pad 27a. Spaced apart bearings 28 affixed to the one side-wall 10c of ramp section 10, swively receive the inner pin portion 29 of a handle H which can be used to transport the folded ramp sections. A clasp 30 has a bearing portion 30a which pivots on the pin portion 29 of handle H, and which is formed with a u-shaped portion 30b which, as FIG. 4 indicates, clamps over the curbed section 11b to hold the ramp sections in assembled position for transport via handle H.

THE OPERATION

As indicated previously, a pair of the ramps are utilized in spaced apart condition to support the four wheels of a vehicle which is being driven up over the ramps R to a truckbed T. The obtuse angularity, indicated by the arrow a in FIG. 1, provides a preferred driveover surface which best suits the purpose. When it is desired to fold the ramps sections 10 and 11 for purposes of transport, it is merely necessary to partly turn sleeve 18c as the folding proceeds and, when this is done, the cable C assumes the ends-crossed over loop condition demonstrated in FIG. 3. This partial pivoting of the sleeve section 18c may be readily accomplished by turning sleeve 18c with the foot, while the hands are occupied in folding the sections 10 and 11. The turning of sleeve 18c twists the mid-portion of the cable out of linearity with its ends and forms the mid loop or web portion x. The cable ends 25 and 26 then slide out away from sleeves 23 and 24, respectively, to accommodate this. The cable is guided during the folding operation so that it assumes the loop form in which it is shown in FIG. 3 and does not belly out of the ramp sections to interface with the internesting thereof. The fact that the cable ends 25 and 26 move forwardly from the sleeve abutments 23 and 24 during the folding operation along with the guide function performed by sleeve 18c, and the cable guiding and retaining function provided by walls 10c and 11c, causes this to occur. When the sections 10 and 11 are being unfolded to assume the FIG. 1 position, the sleeve portion 18b automatically swivels or turns via cable pressure as the unfolding operation proceeds to restore the axial or lengthwise alignment of sleeve 18c.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

I claim:

1. A portable, foldable ramp structure for bridging the space between ground level and a raised level such as the bed of a pickup truck to permit the passage of the wheels of all terrain vehicles and other wheeled products comprising:
    a. a pair of ramp sections, having inner ends and remote ends, bounded by raised side curbs and with non-skid surface provided on the top surfaces thereof between the curbs, said ramp sections being hingedly connected together at the inner ends thereof so as to be extendable to an end-to-end operative position to form a pathway and foldable to coextensive bottom to bottom juxtaposition curb-internested relation for ease of transport;
    b. a somewhat stiff, flexible cable of predetermined length having its ends connected to the remote ends of said ramp sections on the bottom sides of said ramp sections, there being couplers mounting said cable ends on said ramp sections for movement of the cable ends from an extended position to a retracted operative position in which further retracting movement is prevented;
    c. said cable when stretched taut by the weight of the ramp sections and any weight applied thereto, being of a length to hold the ramp sections in extended operative position; and
    d. means for guiding said cable to dispose it in a loop configuration having a loop portion lying in a plane parallel to said top surfaces within the confines of the intermeshed side curbs of the coextensive ramp sections as the latter are folded.

2. The structure defined in claim 1 wherein an angularly disposed bridge piece is fixed to the end of one of the ramp sections for engagement with the bed of a pickup truck or the like.

3. A portable, foldable ramp structure for bridging the space between ground level and a raised level such as the bed of a pickup truck to permit the passage of the wheels of all terrain vehicles and other wheeled products comprising:
  a. a pair of ramp sections, having inner ends and remote ends, bounded by raised side curbs and with non-skid surface provided on the top surfaces thereof between the curbs, said ramps sections being hingedly connected together at the inner ends thereof so as to be extendable to an end-to-end operative position to form a pathway and foldable to coextensive curb-intermeshed relation for ease of transport;
  b. a somewhat stiff, flexible cable of predetermined length having its ends connected to the remote ends of said ramp sections on the bottom sides of said ramp sections;
  c. said cable when stretched taut by the weight of the ramp sections and any weight applied thereto, being of a length to hold the ramp sections in extended operative position;
  d. each ramp section being formed of a sheet of material having a central surface with raised edges formed therein to provide a non-skid surface, said sheet at its sides being bent upwardly to form side V-shaped curbs bordering said non-skid surface, and then being bent downwardly to form cable retaining side wall portions; the one ramp section being of lesser width than the other ramp section so that the cable retaining side wall portions intermesh when the ramp sections are folded; and
  e. pivotal means on one of said ramp sections for guiding said cable to dispose it in a loop configuration having a loop portion lying in a plane parallel to said top surfaces within the confines of the intermeshed side wall portions of the coextensive ramp sections as the latter are folded.

4. A portable, foldable ramp structure for bridging the space between ground level and a raised level such as the bed of a pickup truck to permit the passage of the wheels of all terrain vehicles and other wheels products comprising:
  a. a pair of ramp sections, having inner ends and remote ends, with non-skid surface provided on the top surfaces thereof, said ramp sections being hingedly connected together extended at the inner ends thereof so as to be extendable to an end-to-end operative position to form a pathway and foldable to coextensive bottom to bottom juxtaposition for ease of transport;
  b. a somewhat stiff, flexible cable of predetermined length having its ends connected to the remote ends of said ramp sections on the bottom sides of said ramp sections;
  c. said cable when stretched taut by the weight of the ramp sections and any weight applied thereto, being of a length to hold the ramp sections in extended operative position; and
  d. means for guiding said cable to dispose it in a loop configuration within the confines of the coextensive ramp sections when the latter are folded; and
  e. said ramp sections being connected by a hinge formed by a stationary member on one of said ramp sections to which the other ramp section is pivotally connected; and a strut member mounted to one of said ramp sections, having a sleeve for passing and guiding said cable, said sleeve being swivelably mounted for movement from a position in which said sleeve is in linear alignment with the ramp sections when the ramp sections are in use, to a 90° removed position extending broadside to said ramp sections and generally flush with the bottoms thereof to cause said cable to assume a loop configuration when the ramp sections are folded.

5. The structure set forth in claim 4 wherein the connection of the ends of the cable to the ramp sections comprise coupling means for passing the ends of the cable to permit the ends of the cable to slide with respect to the ramp sections when the ramp sections are folded to co-extensive bottom-to-bottom alignment.

6. The structure set forth in claim 5 wherein said coupling means comprises a pair of sleeves fixed to the bottom of each ramp section through which the ends of the cable extend, and each of the cable ends has an abutment member thereon which, when the ramp sections are unfolded to end-to-end position, comes into engagement with one of said sleeves to hold the cable in taut condition.

7. The structure defined in claim 6 wherein said sleeves at each end of the ramp section are to lie in side-by-side relation when the ramp sections are folded to co-extensive, bottom-to-bottom alignment.

8. The structure defined in claim 7 wherein the sleeve members are offset such that the cable forms a loop in which its ends cross over one another.

9. The structure defined in claim 3 wherein the strut member is laterally centrally mounted to one of said ramp sections and the ends of the cable have a connection to the bottom sides of the ramp members which is offset from lateral alignment one with the other, and each is offset laterally from the strut member.

10. A method of folding a portable ramp structure for bridging the space between ground level and a raised level such as a bed of a pickup truck, the ramp structure comprising a pair of ramp sections with non-skid surfaces provided on the top surfaces thereof, and side walls extending generally angularly to the top surface, the ramp sections being hingedly connected together and, in extended end-to-end relation, forming a pathway; the ramp structure further including a somewhat stiff flexible cable of predetermined length having its ends connected to the remote ends of the ramp sections on the bottom sides of the ramp sections, the cable when stretched taut by the weight of the ramp sections and the load applied thereto being of a length to hold the ramp sections in end-to-end extended operative position, there being a central strut mounted on one of said ramp sections with a sleeve for passing the cable mounted for swiveling movement through a substantially 90° arc; including the steps of:
  a. turning said strut and sleeve while folding the ramp sections toward coextensive bottom-to-bottom alignment to cause the cable to form a loop at its central portion and while bringing the ends of the cable bodily toward one another;
  b. restraining the end portions of the cable extending from the loop laterally via the side wall portions of the ramp sections such as to shape the overall cable in a loop configuration within the confines of the ramp sections.

11. The method defined in claim 10 wherein said strut is automatically moved into abutting relationship with the bottoms of said ramp sections as the latter are folded.

12. The method defined in claim 10 wherein the ends of said cable slide with respect to the ramp sections when the ramp sections are folded to coextensive bottom-to-bottom alignment.

13. The method defined in claim 10 wherein the connections of the ends of the cable move to lie in side-by-side relation when the ramp sections are folded to coextensive bottom-to-bottom alignment, and the cable ends cross over one another to facilitate the looping of the cable.

14. A method of unfolding a portable foldable ramp structure for bridging the space between ground level and a raised level, the ramp structure comprising a pair of ramp sections, with non-skid surface provided on the top surfaces thereof hingedly connected together at adjacent ends and folded to coextensive bottom-to-bottom alignment; the ramp structure, further including a somewhat stiff flexible cable of predetermined length having its ends connected to the remote ends of the ramp sections on the bottom sides of the ramp sections for holding the ramp sections in extended operative position, the cable being disposed in looper configuration within the confines of the folded coextensive ramp sections, and extending through a swivelable central strut fixed to one of the ramp sections, which has a sleeve movable from a position extending broadside relative to the ramp sections to a position axially aligned with the ramp sections, including the steps of:
 a. unfolding the ramp sections from coextensive bottom-to-bottom alignment to a position in which the ramp sections are in end-to-end alignment to form a composite pathway;
 b. simultaneously causing the cable to automatically pivot the strut through a 90° angle to release the cable to assume a linear position and hold the ramp sections in extended operative position.

15. The method defined in claim 14 wherein the ends of the cable move relatively to the bottoms of the ramp sections during unfolding into an abutment position in which they can move no further and hold the ramp sections in extended operative position.

* * * * *

UNITED STATES PATENT AND TRADEMARK OFFICE
CERTIFICATE OF CORRECTION

PATENT NO. : 4,779,298
DATED : October 25, 1988
INVENTOR(S) : Nichols, St. et al.

It is certified that error appears in the above-identified patent and that said Letters Patent is hereby corrected as shown below:

Column 1, line 38, change "bottomto-bottom" to -- bottom-to-bottom --.

Column 2, line 1, change "extent" to -- extend --.

Column 2, line 64, change "he" to -- the --.

Column 3, line 17, change "grooves" to -- grooved --.

Column 4, line 12, change "interface" to -- interfere --.
Column 5, line 6, change "ramps" to -- ramp --.
Column 5, line 39, change "wheels" to -- wheeled --.

Column 5, line 44, delete "extended"

Column 6, line 20, insert -- offset from one another -- after "are".

Signed and Sealed this

Ninth Day of May, 1989

*Attest:*

DONALD J. QUIGG

*Attesting Officer*  *Commissioner of Patents and Trademarks*